United States Patent
Milojicic et al.

(10) Patent No.: US 7,114,095 B2
(45) Date of Patent: Sep. 26, 2006

(54) APPARATUS AND METHODS FOR SWITCHING HARDWARE OPERATION CONFIGURATIONS

(75) Inventors: Dejan S. Milojicic, Palo Alto, CA (US); Alan Messer, Los Gatos, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 559 days.

(21) Appl. No.: 10/157,890

(22) Filed: May 31, 2002

(65) Prior Publication Data

US 2003/0226057 A1    Dec. 4, 2003

(51) Int. Cl.
*G06F 11/00*    (2006.01)

(52) U.S. Cl. .......................................... 714/13; 714/11

(58) Field of Classification Search .................. 714/11, 714/13
See application file for complete search history.

(56) References Cited

U.S. PATENT DOCUMENTS

| | | | |
|---|---|---|---|
| 5,968,185 A * | 10/1999 | Bressoud et al. | 714/10 |
| 6,199,179 B1 * | 3/2001 | Kauffman et al. | 714/26 |
| 6,728,896 B1 * | 4/2004 | Forbes et al. | 714/4 |
| 6,854,072 B1 * | 2/2005 | Cagle et al. | 714/15 |
| 6,931,568 B1 * | 8/2005 | Abbondanzio et al. | 714/11 |
| 2004/0199812 A1 * | 10/2004 | Earl et al. | 714/13 |

* cited by examiner

*Primary Examiner*—Dieu-Minh Le
(74) *Attorney, Agent, or Firm*—Richard P. Lange

(57) ABSTRACT

A system for switching between computer hardware configurations is provided. The system may include multiple processors and an operating system that facilitates switching between a lock step or fail-over processing operation configuration and a multiprocessor operation configuration.

13 Claims, 5 Drawing Sheets

APPARATUS AND METHODS FOR SWITCHING HARDWARE OPERATION CONFIGURATIONS

TECHNICAL FIELD

The present invention relates generally to computer processors, and more particularly to methods and apparatus for switching hardware configurations.

BACKGROUND ART

The increasing complexity and sophistication of present day hardware systems has led to an increase in the opportunity for operating errors. Many computing system failures stem from hardware errors. Processors, caches, and memories are becoming larger, faster, and more dense, while being increasingly used in adverse environments, such as high altitudes, in space, and in industrial applications. Hardware errors may be characterized as hard errors and transient (soft) errors. Hard errors are those that require replacement (or relinquished use) of a component. Typically, such errors are the product of physical damage. Transient or soft errors are those that result in an invalid state in the hardware that is normally correctable. A typical processor's silicon can have a soft-error rate of 4000 FIT (1 FIT equals 1 failure in $10^9$ h), of which approximately 50% will affect processor logic and 50% the large on-chip cache. Due to increasing speeds, denser technology, and lower voltages, these errors are likely to become more probable than other single hardware component failures.

Techniques such as Error Correction Codes (ECC) and Chipkill (as described by Timothy J. Dell, "A White Paper on the Benefits of Chipkill-Correct ECC for PC Server Main Memory" IBM Microelectronics Division, July 1997) have been used in main memories to correct some errors. Unfortunately, such techniques only help reduce visible error rates for semiconductor elements that can be covered by such codes (large storage elements). With raw error rates increasing with technological progress and more complicated interconnected memory subsystems, ECC is unable to address all the soft-error problems. Presently available hardware and software provide little to no support for recovery from errors not covered by ECC, whether detected or not.

One solution to provide increased reliability of hardware systems, and processors in particular, has been fail-over technology or lock stepping. In this system, a second processor operates to check the progress of a first processor, and take over the operation in the event of a failure. While this system may provide increased reliability, the cost is that a second processor must be dedicated to the fail-over support of a first processor.

Alternatively, an operating system may utilize a multiprocessor mode, whereby the operating system divides tasks among and between a plurality of processors. The overall processing speed of such a device is increased for a given operation, since the individual arithmetic and logic operations that make up a larger operation may be performed in parallel. Multiprocessing is most effective when the application software being run is designed for multiprocessing. This design preferably involves structuring the software such that it may be broken into smaller routines that can be performed independently. Even where software does not lend itself well to being broken into such discrete units for multiprocessing, the operating system may still make use of the additional processors through multitasking, where the operating system would assign different applications to different processors.

One problem with presently available processing systems and the software that drives these systems is that they may not switch between a multiprocessor mode and a fail-over processing mode.

SUMMARY

In their most basic respects, certain embodiments of the present invention provide a system for switching between computer hardware operation configurations. The configurations include at least two processors capable of being used in a multiprocessing system and an operating system configured to support multiprocessing. The processors and operating system are also configured to support fail-over processing and to facilitate switching between multiprocessing and fail-over processing.

In another embodiment, the present invention provides a method for switching between hardware operation configurations that includes the steps of providing software to switch between a fail-over processor configuration and a multiprocessor configuration and installing software to switch between a fail-over processor configuration and a multiprocessor configuration. The method may also include any of the steps of initiating a switch between a fail-over processor operation configuration; clearing one processor of operations; switching off pending operations; and waiting for pending operations to reach completion. Further, the method may include any of the steps of changing or invoking exception handlers; and changing or invoking interim handlers. Finally, the method may include the steps of entering a fail-over processing configuration or entering a multiprocessing configuration.

In yet other respects, the invention is computer readable media on which are embedded programs that perform the above methods.

Additional advantages and novel features of the present invention will be set forth in part in the description which follows and in part will become apparent to those skilled in the art upon examination of the following or may be appreciated further by practice of the invention.

BRIEF DESCRIPTION OF THE DRAWINGS

Features and advantages of the present invention will become apparent to those skilled in the art from the following description with reference to the drawings, in which like numerals are intended to indicate like elements and in which.

DETAILED DESCRIPTION OF PREFERRED EMBODIMENTS

For simplicity and illustrative purposes, the principles of the present invention are described by referring mainly to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the true spirit and scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation.

Figure 1:
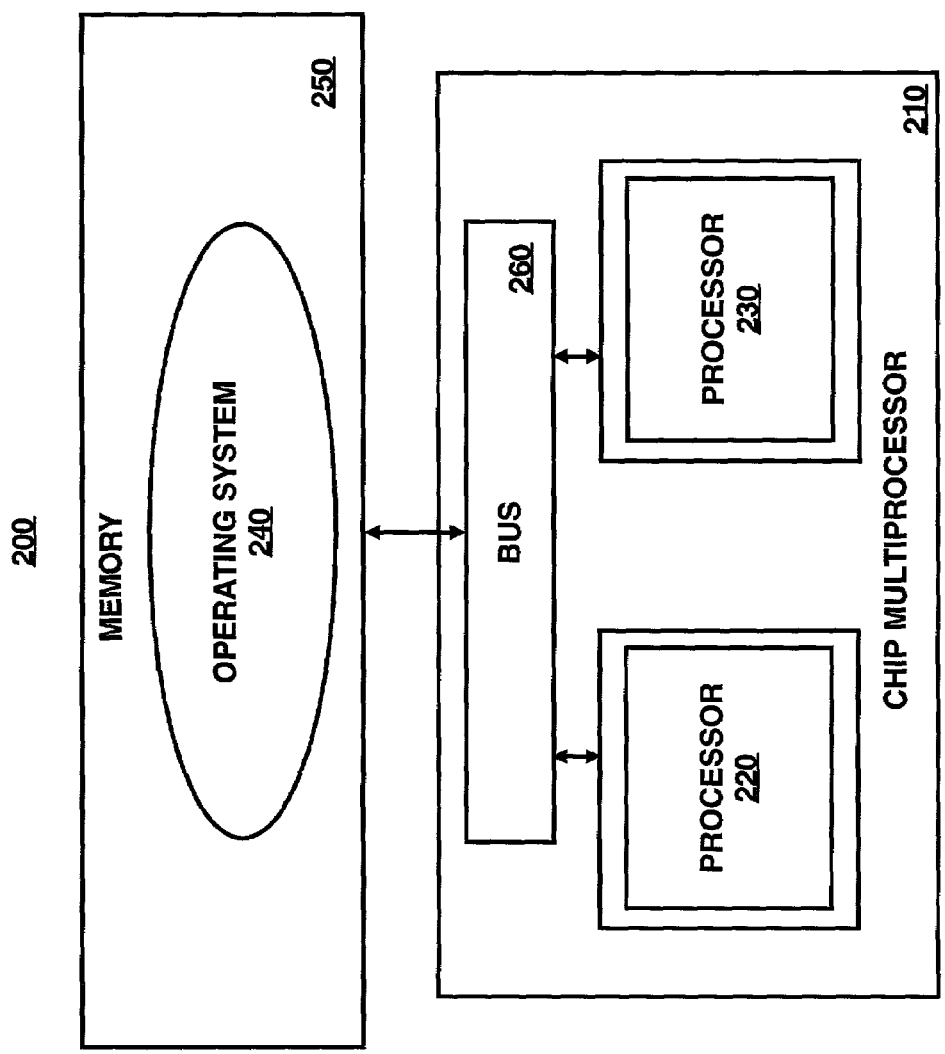
FIG. 1 depicts a processing scheme.

FIG. 1 shows a conventional processing system of which a multiprocessor scheme 200 according to an embodiment of the present invention may be employed. The multiprocessor scheme 200 includes a computer system having a chip multiprocessor 210. The chip multiprocessor 210 includes multiple processors 220 and 230. As is known in the art, these processors 220 and 230 may be attached to a motherboard, and/or other computer board. The chip multiprocessor 210 may include several more processors (not shown) and is not limited to two processors. The processors 220 and 230 may be managed by a single operating system 240 stored in a memory 250. The processors 220 and 230 may communicate with the memory 250 via a bus 260, such as a system bus or a processor bus. The multiprocessor scheme 200 may also include a chipset (not shown).

Where the operating system 240 utilizes fail-over technology, a first processor 220 performs arithmetic and logic operations while a second processor 230 serves to check that the operations of the first processor 220 are properly performed. The second processor 230 is available to take over the operations in the event that the first processor 220 fails. Thus, one skilled in the art can appreciate that the second processor 230 is unavailable for performing its own logic and arithmetic operations.

Figure 2A:
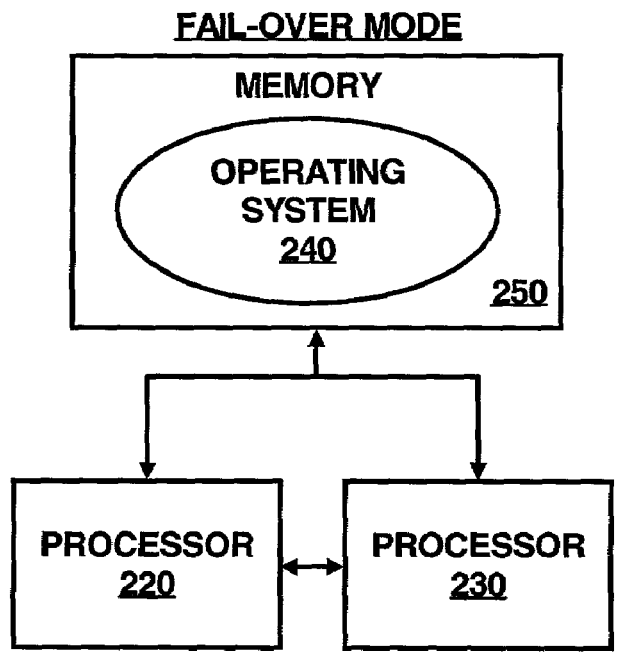
FIG. 2A depicts another processing scheme.

FIG. 2a shows a schematic of a first processor 220 and a second processor 230 as they operate in fail-over (also referred to as lock step mode). In such operation, the first processor 220 and second processor 230 are in communication (which may be provided through a bus, such as a processor bus) such that the second processor 230 may monitor the operation of the first processor 220 and take over the tasks being performed by the first processor 220 in the event of a failure. FIG. 2a also shows an operating system 240 stored in a memory 250 similar to that shown in FIG. 1.

Figure 2B:
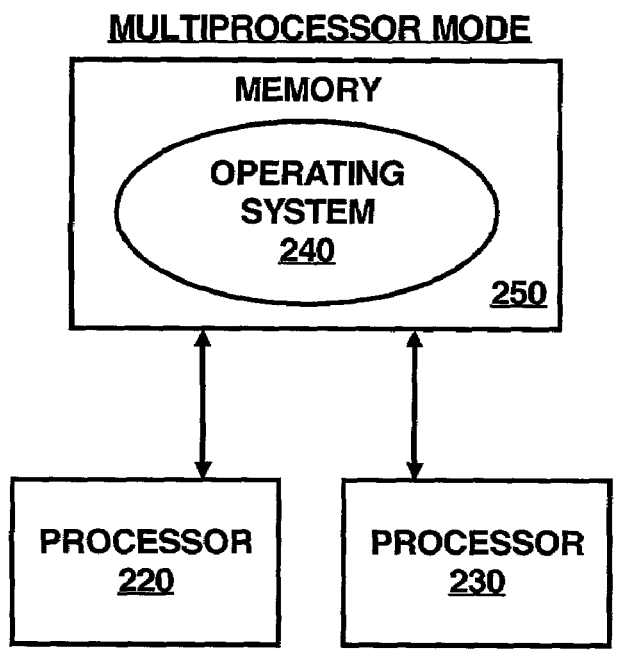
FIG. 2B depicts another processing scheme.

FIG. 2b shows a schematic of a first processor 220 and a second processor 230 as they operate in multiprocessor mode. Typically, the various operations involved in an application are divided into discrete units such that one processor is assigned the operations in a unit. The results of such various operations are then combined to complete the operations of the application. FIG. 2b also shows an operating system 240 stored in a memory 250 similar to that shown in FIG. 1.

Figure 3:
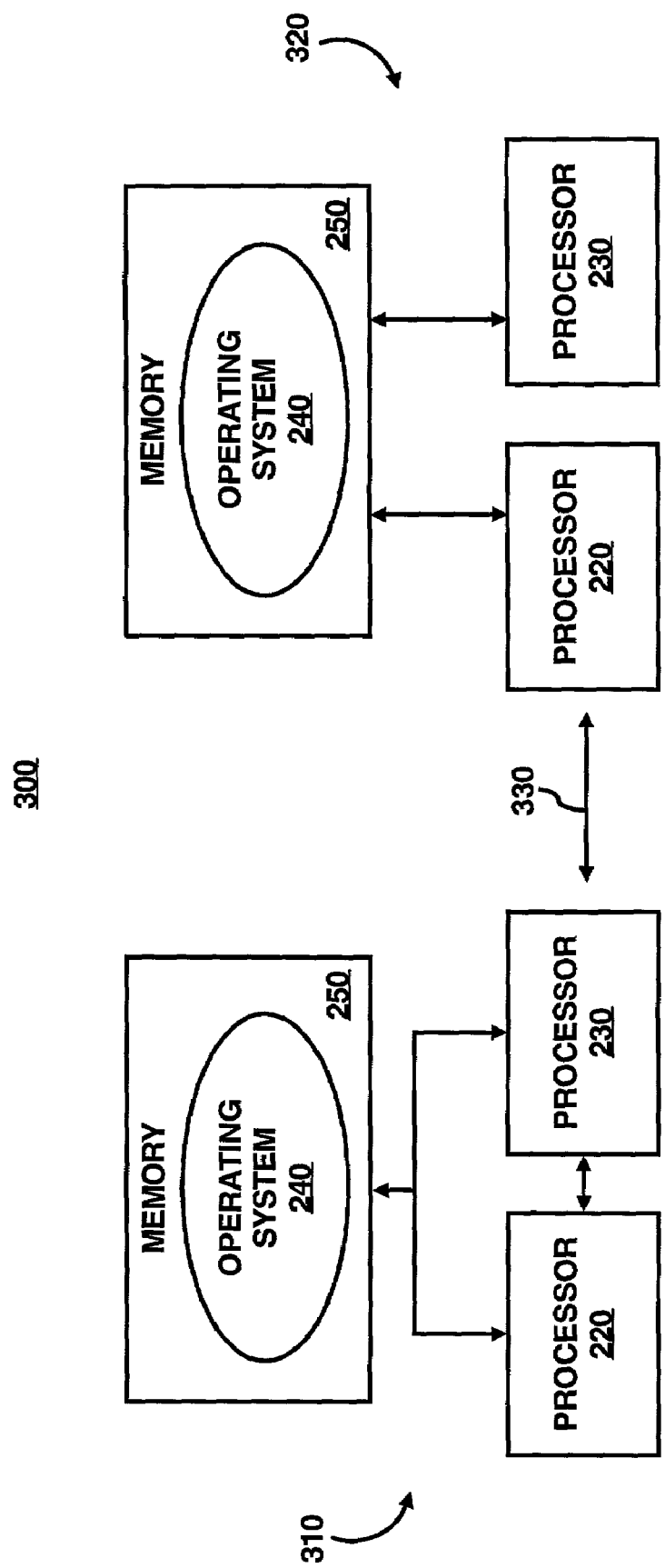
FIG. 3 depicts yet another processing scheme.

FIG. 3 shows a system 300 wherein processors 220 and 230 operate in fail-over mode 310 or in multiprocessor mode 320. The double headed arrow 330 is intended to indicate that the processors may alternate or switch between these two hardware operation configurations. Thus, it may be appreciated that the system 300 may be operated using a first hardware operation configuration, such as fail-over mode 310, and later second hardware operation configuration, such as multiprocessor mode 320, and then the first hardware operation configuration, such as fail-over mode 310, again. The system 300 may endlessly switch between such hardware operation configurations.

For purposes of this disclosure the term hardware operation configuration is intended to reference the mode of operation of hardware in a computer system. In one embodiment, the term hardware operation configuration is described by whether a computer processor system operates in fail-over mode or in multiprocessor mode. It should be appreciated that the invention is not limited in its application to switching between these two modes and switching between other modes may be provided by a suitable system and still be within the scope of the presently contemplated invention.

As can be appreciated from FIG. 3, such a system preferably includes at least two processors 220 and 230 which are in communication with a memory 250 within which is stored operating system 240, similar to that depicted in FIGS. 1, 2, and 3. Preferably, the operating system 240 can dynamically switch between the fail-over mode 310 and the multiprocessor mode 320. This may include activating reliability mechanisms, such as exception handlers, system integrity verifiers, and software redundancy models, among others. These reliability mechanisms are typically comprised of software running at the same time as, or otherwise resident as part of, the operating system 240. The reliability mechanisms are not however limited to such a structure, and their functionality may be provided through other means.

An exception is an event occurring during program execution which is disruptive to the operation of program execution. Typically, software is constructed to handle errors in accordance with the particular error that occurs. Exception handlers may be a set of methods to deal with a particular type of error. The exception handlers are typically stored outside the main framework of the software but are available so that they may be called upon when necessary.

A system integrity verifier ensures that a program or system is properly operating. These verifiers may be used in fail-over mode to ensure that a processor is operating go, correctly. When used in this capacity, the verifier may send a signal to a second processor to take over the functions of the processor that are not operating correctly or that have otherwise failed.

A software redundancy model ensures increased reliability in a system. Software redundancy is commonly used in addition to the intrinsic Error Detection Mechanisms (EDMs) of the system, for example, exceptions and memory protection. Software redundancy may take on a variety of different forms. One commonly used form involves duplicating some or all of the program variables in order to introduce data redundancy and then modifying operators to manage the duplicates of the variables. Consistency checks are then introduced to periodically verify consistency between the two copies of each variable.

Figure 4:
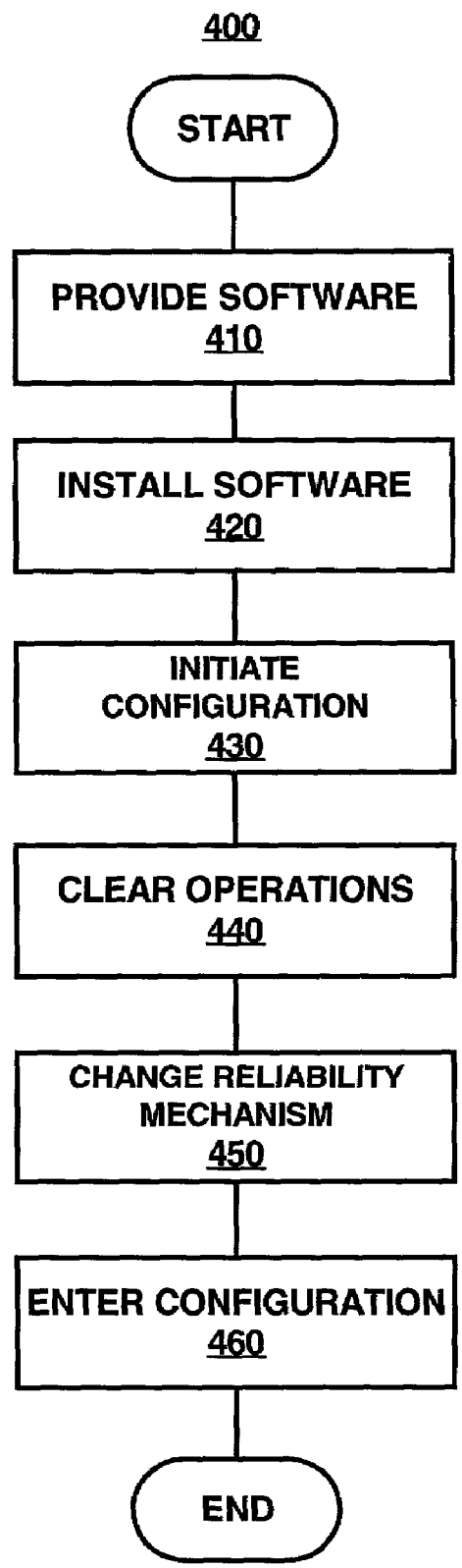
FIG. 4 depicts a method in accordance with one embodiment of the invention.

FIG. 4 depicts a method 400 in accordance with one embodiment of the present invention. It should be appreciated that not all of the steps depicted are necessary in accordance with certain embodiments of the invention, but are provided for ease of description. The method 400 includes a step 410 for providing software to switch between a fail-over processor configuration and a multiprocessor configuration. The software may be provided in any of a variety of forms.

The method 400 may also include an install step 420 for installing software 420. The install step 420 may take on any of a variety of embodiments including installing software on a computer readable media such as a magnetic disk. The install step 420 may also include uploading software from a computer readable media, network, Internet, or another source, into a computer's memory. In a preferred embodiment, the software is managed by the operating system for a computer.

In one embodiment, the method 400 includes an initiate step 430 to initiate either a fail-over processor configuration or a multiprocessor configuration. As previously described with regard to the system, this step may include switching to take the system from a fail-over processor configuration to a multiprocessor configuration or, alternatively switching may take the system from a multiprocessor configuration to a fail-over processor configuration. In one embodiment, the initiate step is used during the computer's initial boot up sequence to start either a fail-over processor configuration or a multiprocessor configuration.

The method 400 may also include a clear step 440 for clearing one processor of pending operations. The clear step 440 may involve actively switching off pending operations or alternatively it may involve waiting for pending operations to reach completion (or drain through the processor) or a combination of actively switching off pending operations and waiting for pending operations to reach completion. The clear step 440 is of particular use when switching from a multiprocessor configuration to the fail-over processor configuration, since it is desirable for the secondary processor that is to enter fail-over processor configuration to have completed all its operations or otherwise be empty of operations before it actually begins fail-over processing.

The method 400 may also include a change step 450 for changing one or more reliability mechanisms. Such reliability mechanisms would include exception handlers, system integrity verifiers, and software redundancy modules. The change step 450 may take on any of a variety of different forms. In one embodiment the change step 450 involves changing the parameters or instruction set under which or according to which the reliability mechanism operates. In another embodiment, the change step 450 involves activating a reliability mechanism or deactivating a reliability mechanism.

The method 400 preferably includes an enter step 460 for entering a hardware operation configuration, preferably a hardware operation configuration different from the one that was previously being employed by the system. In one embodiment, the enter step 460 involves beginning a fail-over processing configuration where a multiprocessing configuration was previously being used. In another embodiment, the enter step 460 involves beginning a multiprocessing configuration where a fail-over processing configuration was previously being used. In yet another embodiment, the enter step 460 involves beginning either a multiprocessing configuration or a fail-over processing configuration where the computer is in the initial bootup or startup sequence.

Figure 5:
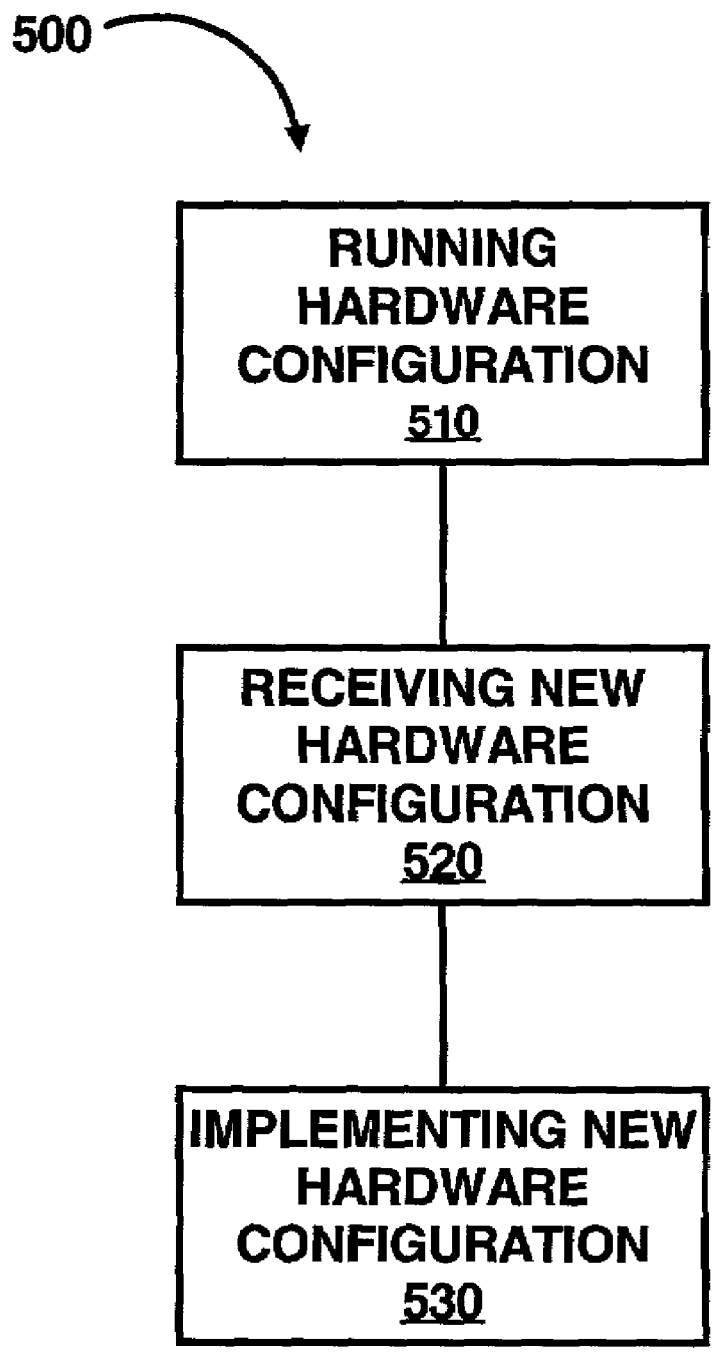
FIG. 5 depicts another method in accordance with an embodiment of the invention.

FIG. 5 depicts a method 500 in accordance with one embodiment of the present invention. In FIG. 5, a hardware configuration, either fail-over processing, or multiprocessing, is operating or running 510.

The method 500 includes a step 520 of receiving a selection of a new hardware operation configuration 520. For instance, if the present hardware operation configuration is fail-over processing, the new hardware operation configuration may be multiprocessing. Alternatively, if the present hardware operation configuration is multiprocessing, the new hardware operation configuration may be fail-over processing. A selection for a new hardware operation configuration may be received in response to a query sent to the user, such as a question sent to the user that requires user input before continuing. In such an embodiment, this query may be sent during the computer startup sequence such that the computer will be set to operate using a particular hardware operation configuration throughout the term of the user session. Alternatively, a computer may be configured such that one hardware operation configuration serves as a default, such as a multiprocessor configuration, and the computer may then be reset or switched by the user to begin another hardware operation configuration. In yet another alternative, the computer may be configured such that it automatically begins a particular hardware operation configuration depending on the software being run by the system.

The method also includes the step of implementing a new hardware operation configuration 530. The step of implementing a new hardware operation configuration 530 will vary depending on the new hardware operation configuration selected. For instance, where the new hardware operation configuration is a multiprocessor configuration, the step of implementing the new hardware operation configuration 530 may include the steps of changing one or more reliability mechanisms. The step of changing one or more reliability mechanisms may involve deactivating reliability mechanisms and may involve changing exception handlers and may involve stopping software redundancy models. With a new hardware operation configuration is a fail-over processor configuration, the step of implementing the new hardware operation configuration 530 may include the steps of changing one or more reliability mechanisms. The step of changing one or more reliability mechanisms may involve activating reliability mechanisms and may involve changing exception handlers and may involve invoking software redundancy models. In order to begin a fail-over processor configuration the method may also include the step of clearing one or more processors of operations by either or both of switching offending operations and waiting for pending operations to reach completion.

The method 500 can be performed by a computer program. The computer program can exist in a variety of forms, both active and inactive. For example, the computer program can exist as software comprised of program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While the invention has been described with reference to certain exemplary embodiments thereof, those skilled in the art may make various modifications to the described embodiments of the invention without departing from the true spirit and scope of the invention. The terms and descriptions used herein are set forth by way of illustration only and not meant as limitations. In particular, although the present invention has been described by examples, a variety of other devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the spirit and scope of the invention as defined in the following claims and their equivalents.

What is claimed is:

1. A multiple processor computer system comprising:
   two processors having a first processor and a second processor, the two processors configured to operate in a multiprocessing mode, wherein the two processors operate in parallel with each other, and a fail-over processing mode, wherein the first processor takes over an operation of the second processor in an event of a failure of the second processor;
   at least one operating system executed by the two processors, wherein the at least one operating system is configured to support multiprocessing in the multiprocessing mode, to support fail-over processing in the fail-over processing mode, and to facilitate switching between multiprocessing and fail-over processing; and
   at least one changeable reliability mechanism that includes at least one of
      a reliability mechanism operable to be activated;
      a reliability mechanism operable to be deactivated;
      an exception handler operable to be changed;
      a system integrity verifier operable to be activated;
      a system integrity handler operable to be deactivated;
      a software redundancy model operable to begin; and
      a software redundancy model operable to stop.

2. The system of claim 1, wherein the system integrity verifier provides detection of at least one processor error.

3. The system of claim 2, wherein the exception handler handles a processor error in response to the system integrity verifier detecting the processor error.

4. The system of claim 1, wherein the software redundancy model provides duplication of some or all program variables in the software redundancy model in order to introduce data redundancy.

5. The system of claim 1, wherein said fail-over processing comprises a first processor of the at least two processors monitoring the operations of a second processor of the at least two processors, wherein said first processor takes over the operations of the second processor.

6. A method for switching between hardware operation configurations, the configurations being utilized in a multiple processor computer system having multiple processors, the method comprising the steps of:
   running a hardware operation configuration in a multi-processing mode, wherein at least two of the multiple processors operate in parallel with each other;
   receiving a selection of a hardware operation configuration for a fail-over processing mode;
   implementing the selected hardware operation configuration in the fail-over processing mode, wherein one of the multiple processors takes over an operation of another one of the multiple processors in an event of a failure of the another one of the multiple processors; and
   changing one or more reliability mechanisms by at least one of:
      activating the one or more reliability mechanisms;
      deactivating the one or more reliability mechanisms;
      changing at least one exception handler;
      activating at least one system integrity verifier;
      deactivating the at least one system integrity verifier;
      beginning at least one software redundancy models; and
      stopping the at least one software redundancy models.

7. The method of claim 6, wherein said selected hardware operation configuration is different from the running hardware configuration.

8. The method of claim 6, further comprising the step of:
   initiating a switch between hardware operation configurations.

9. The method of claim 6, further comprising the step of:
   clearing one or more processors of operations.

10. The method of claim 9, wherein said step of clearing one or more processors of operations comprises the step of:
    switching off pending operations.

11. The method of claim 9, wherein said step of clearing one or more processors of operations comprises the step of:
    waiting for pending operations to reach completion.

12. A computer readable medium on which is encoded program code for switching between hardware operation configurations in a multiprocessor system, the program code comprising:
    program code for switching between a fail-over processor configuration and a multiprocessor configuration in the multiprocessor system;
    wherein the fail-over processor configuration includes a configuration in which one processor in the multiprocessor system takes over an operation of another processor in the multiprocessor system;
    wherein the multiprocessor configuration includes a configuration in which one processor in the multiprocessor system operates in parallel with another processor in the multiprocessor system; and
    program code for changing one or more reliability mechanisms by at least one of:
       activating the one or more reliability mechanisms;
       deactivating the one or more reliability mechanisms;
       changing at least one exception handler;
       activating at least one system integrity verifier;
       deactivating the at least one system integrity verifier;
       beginning at least one software redundancy models; and
       stopping the at least one software redundancy models.

13. The computer readable medium of claim 12, further comprising:
    program code for running the fail-over processor configuration, wherein a first processor in the multiprocessor system takes over an operation of a second, processor in the multiprocessor system; and
    program code for running the multiprocessor configuration, wherein the first processor in the multiprocessor system operates in parallel with the second processor in the multiprocessor system.

* * * * *

UNITED STATES PATENT AND TRADEMARK OFFICE
CERTIFICATE OF CORRECTION

PATENT NO. : 7,114,095 B2 Page 1 of 1
APPLICATION NO. : 10/157890
DATED : September 26, 2006
INVENTOR(S) : Dejan S. Milojicic et al.

It is certified that error appears in the above-identified patent and that said Letters Patent is hereby corrected as shown below:

On the title page, item (73), in "Assignee", in column 1, line 2, delete "LP.," and insert -- L.P., --, therefor.

In column 4, line 37, after "operating" delete "go,".

In column 7, line 29, in Claim 1, delete "of" and insert -- of: --, therefor.

In column 8, line 58, in Claim 13, delete "second," and insert -- second --, therefor.

Signed and Sealed this

Thirteenth Day of January, 2009

JON W. DUDAS
*Director of the United States Patent and Trademark Office*